United States Patent
Tsurumi et al.

(10) Patent No.: US 10,161,330 B2
(45) Date of Patent: Dec. 25, 2018

(54) CONSTRUCTION MACHINE

(71) Applicant: KOBELCO CONSTRUCTION MACHINERY CO., LTD., Hiroshima-shi (JP)

(72) Inventors: Toshiki Tsurumi, Hyogo (JP); Tsukasa Kimitani, Hyogo (JP); Joji Terasaka, Hyogo (JP); Shintaroh Sasai, Hyogo (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 49 days.

(21) Appl. No.: 15/346,861

(22) Filed: Nov. 9, 2016

(65) Prior Publication Data

US 2017/0145937 A1    May 25, 2017

(30) Foreign Application Priority Data

Nov. 20, 2015    (JP) .................................. 2015-227558

(51) Int. Cl.
*F02D 41/02* (2006.01)
*F02D 41/04* (2006.01)
(Continued)

(52) U.S. Cl.
CPC .......... *F02D 41/0235* (2013.01); *B66C 13/16* (2013.01); *B66C 13/18* (2013.01);
(Continued)

(58) Field of Classification Search
CPC .......... F01N 3/02; F01N 3/206; F01N 11/002; F01N 2610/11; B66C 13/16; B66C 13/18; B66C 13/54; B66C 15/06; B66C 23/36; F02D 41/0235; F02D 41/042; F02D 2041/0265

See application file for complete search history.

(56) References Cited

U.S. PATENT DOCUMENTS

2005/0149244 A1    7/2005    Matsuda
2006/0000201 A1    1/2006    Iizuka et al.
(Continued)

FOREIGN PATENT DOCUMENTS

JP    2003-118431    4/2003
JP    2005-36770 A    2/2005
(Continued)

OTHER PUBLICATIONS

Office Action dated Aug. 29, 2017 in Japanese Patent Application No. 2015-227558 (with English Summary from the EPO Global Dossier).

(Continued)

*Primary Examiner* — Audrey K Bradley
(74) *Attorney, Agent, or Firm* — Oblon, McClelland, Maier & Neustadt, L.L.P.

(57) ABSTRACT

A cooling time computing unit computes, based on a temperature detected by a temperature detection unit, a cooling time during which an injection unit is cooled by driving of an engine. A notification control unit uses a notification unit to notify an operator of a necessity of cooling before the engine is stopped, during the cooling time computed by the cooling time computing unit.

11 Claims, 6 Drawing Sheets

(51) Int. Cl.
  *F01N 3/021* (2006.01)
  *F01N 3/20* (2006.01)
  *B66C 15/06* (2006.01)
  *B66C 13/16* (2006.01)
  *B66C 13/18* (2006.01)
  *B66C 13/54* (2006.01)
  *F01N 3/02* (2006.01)
  *F01N 11/00* (2006.01)
  *B66C 23/36* (2006.01)

(52) U.S. Cl.
  CPC .............. *B66C 13/54* (2013.01); *B66C 15/06* (2013.01); *F01N 3/02* (2013.01); *F01N 3/206* (2013.01); *F01N 3/2066* (2013.01); *F01N 11/002* (2013.01); *F02D 41/042* (2013.01); *B66C 23/36* (2013.01); *F01N 2560/06* (2013.01); *F01N 2590/08* (2013.01); *F01N 2610/02* (2013.01); *F01N 2610/11* (2013.01); *F01N 2900/08* (2013.01); *F01N 2900/1602* (2013.01); *F02D 2041/0265* (2013.01); *F02D 2200/0802* (2013.01)

(56) References Cited

U.S. PATENT DOCUMENTS

2013/0031890 A1    2/2013   Shovels et al.
2015/0198074 A1    7/2015   Mori et al.

FOREIGN PATENT DOCUMENTS

| JP | 2005-68830 | | 3/2005 |
| JP | 2005-299418 | | 10/2005 |
| JP | 2006-266221 | | 10/2006 |
| JP | 2007-231795 A | | 9/2007 |
| JP | 2012-17687 | | 1/2012 |
| JP | 2012017687 A | * | 1/2012 |
| JP | 5562503 | | 7/2014 |
| JP | 2014-522945 | | 9/2014 |

OTHER PUBLICATIONS

Office Action dated Jan. 16, 2018 in Japanese Patent Application No. 2015-227558 (with English summary obtained from the EPO global dossier), 7 pages.

* cited by examiner

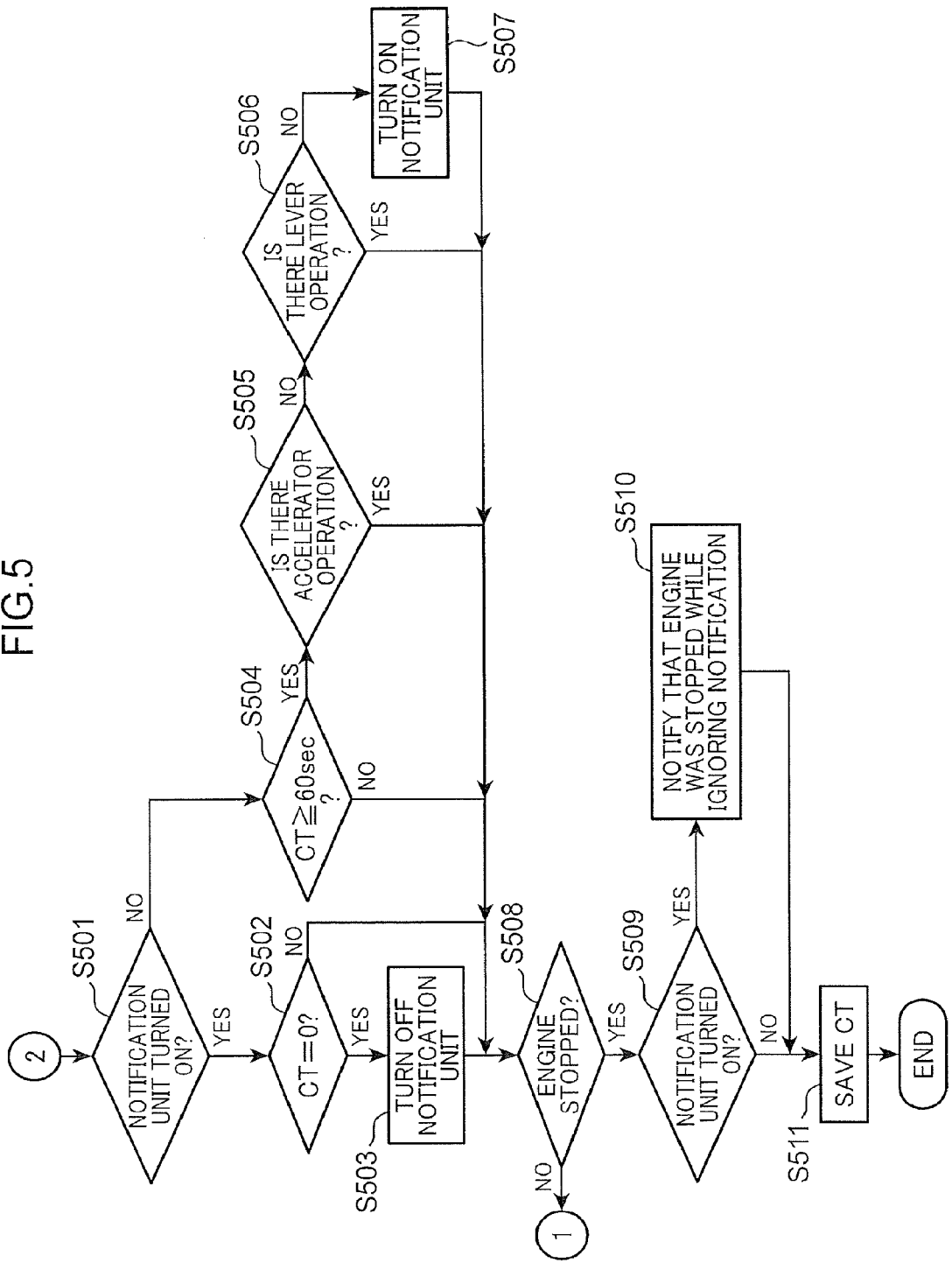

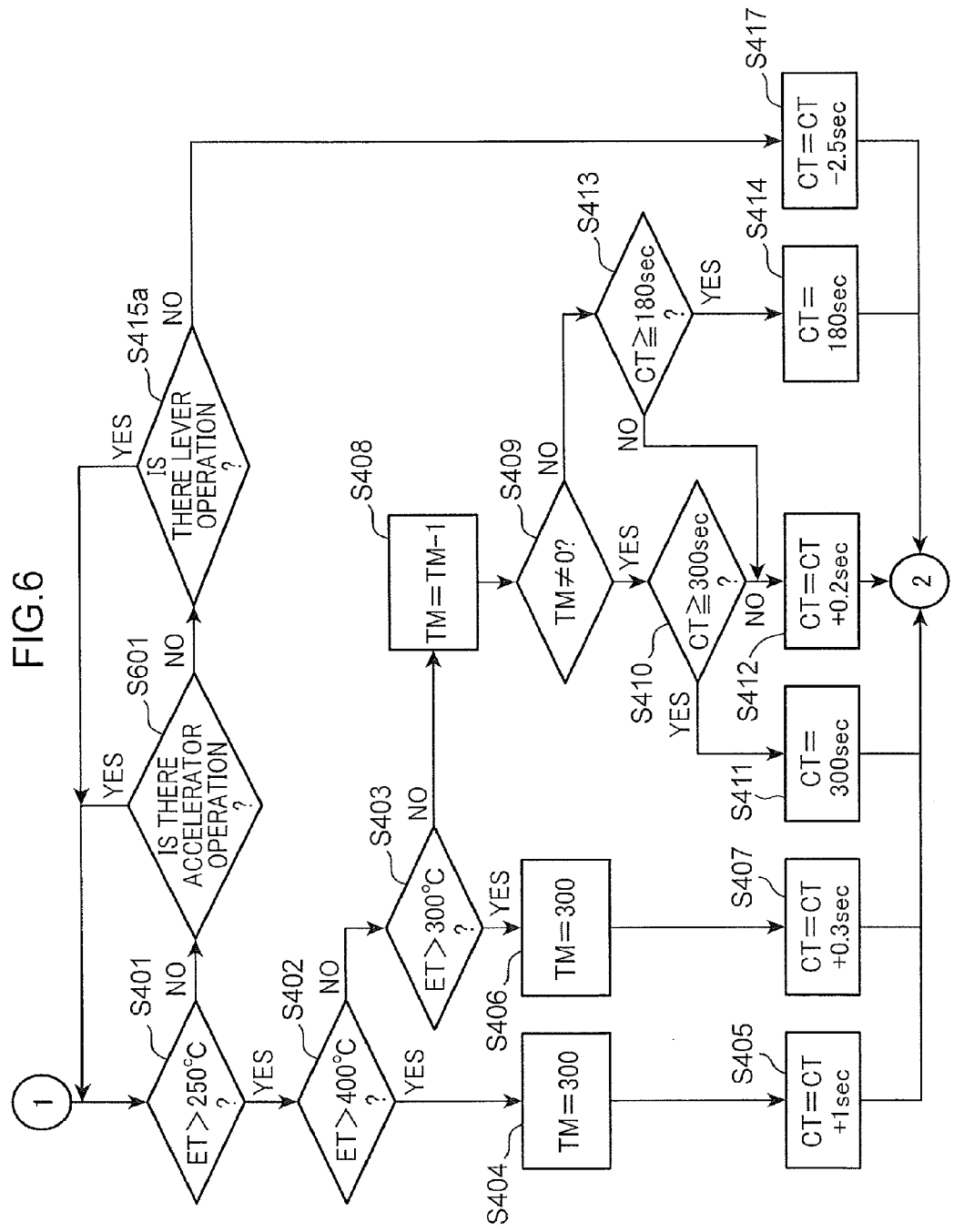

CONSTRUCTION MACHINE

BACKGROUND OF THE INVENTION AND RELATED ART STATEMENT

Technical Field

The present invention relates to a construction machine equipped with an exhaust purification function.

Background Art

A selective catalytic reduction (SCR) apparatus is an example of apparatuses for purifying NOx in exhaust gas of a diesel engine.

With an SCR apparatus, there is a problem in that, when an engine is stopped by turning off an ignition key or the like, a temperature of a dosing valve rises due to residual exhaust gas in an exhaust tube and causes urea water to deteriorate in the dosing valve. In consideration thereof, Japanese Unexamined Patent Publication No. 2012-17687 discloses a technique involving, based on exhaust gas temperature when an engine is stopped, setting a cooling time required for a temperature of a dosing valve to drop to a temperature at which urea water is less likely to deteriorate, and injecting urea water from the dosing valve until the cooling time lapses from the moment the engine is stopped in order to cool the dosing valve.

Japanese Patent No. 5562503 discloses a technique which involves counting the number of times an engine has been stopped when the temperature of an injection apparatus adopted to inject a reducing agent was high; and when a count value exceeds a first prescribed value, issuing a warning such as "Let engine idle, then turn off key."

However, in Japanese Unexamined Patent Publication No. 2012-17687, since urea water is injected after the engine is stopped, there is a problem in that water content in the urea water evaporates and urea is deposited, and the deposited urea crystallizes and adheres to an exhaust tube or the like to cause clogging of the exhaust tube.

Since Japanese Patent No. 5562503 adopts "150" as the first prescribed value and the injection apparatus is repeatedly exposed to a high-temperature environment, there is a problem in that the injection apparatus cannot be sufficiently protected. In addition, since the cooling time is not calculated in Japanese Unexamined Patent Publication No. 2012-17687, an operator has no idea how long an idle time must continue before turning off the engine. Japanese Patent No. 5562503 has another problem in that, since the engine is turned off without the injection apparatus having been sufficiently cooled, the injection apparatus cannot be sufficiently protected.

SUMMARY OF INVENTION

An object of the present invention is to provide a construction machine capable of reducing a risk of failure of an injection unit which injects a reducing agent.

A construction machine according to an aspect of the present disclosure is a construction machine equipped with an exhaust purification function, the construction machine including:

an engine;

an injection unit which injects a reducing agent for removing nitrogen oxides in exhaust gas discharged from the engine;

an after treatment device which is connected to the injection unit and which purifies the exhaust gas discharged from the engine using the injected reducing agent;

a temperature detection unit which detects a temperature of the after treatment device;

a cooling time computing unit which computes a cooling time based on the temperature detected by the temperature detection unit, the cooling time being a period of time during which cooling of the injection unit is performed with the exhaust gas discharged from the engine; and a notification unit which notifies an operator of a necessity of the cooling before stopping the engine during the cooling time computed by the cooling time computing unit.

According to this configuration, the engine can be prevented from being stopped despite the injection unit being in a high-temperature state and a risk of failure of the injection unit can be reduced.

BRIEF DESCRIPTION OF DRAWINGS

FIG. 5 is a flow chart representing a continuation of FIG. 4; and

FIG. 6 is a flow chart showing an example of processing of a crawler crane according to a second embodiment of the present invention.

Figure 1:
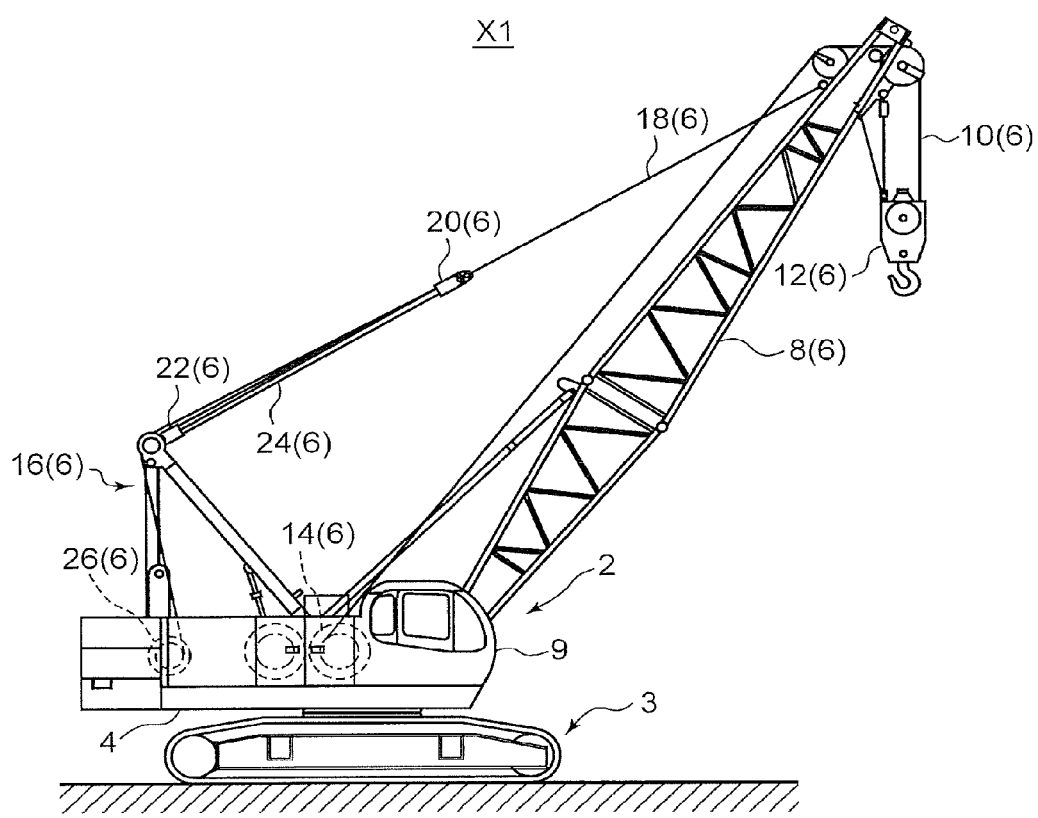
FIG. 1 is an external view of a crawler crane to which the construction machine according to an embodiment of the present invention has been applied.

DESCRIPTION OF EMBODIMENTS (Circumstances Leading Up to Present Invention)

Construction machines such as a crane are provided with a after treatment device for purifying exhaust gas of a diesel engine. An injection unit which injects urea water is connected to the after treatment device, and the after treatment device reduces NOx contained in the exhaust gas using the urea water injected from the injection unit.

Since the injection unit is connected to the after treatment device, the injection unit is subjected to high-temperature heat from the after treatment device and from peripheral atmosphere, and a high-temperature state of the injection unit continues for a certain period even after the engine is stopped. The longer a period in which exhaust temperature is high until the engine stops, the longer the continuation of the high-temperature state.

In addition, although the injection unit is cooled by cooling water circulating through cooling piping when the diesel engine is being driven, once the diesel engine is stopped, driving of a cooling pump which causes the cooling water to circulate also stops and the cooling water loses its cooling effect.

Therefore, when the diesel engine stops, the temperature of the injection unit rises rapidly. As a result, a problem of a failure of the injection unit occurs. Furthermore, when the injection unit enters a high-temperature state, another problem occurs in that water content in the urea water evaporates and urea crystals are deposited, and the crystals adhere to urea water piping and a urea water injection port to cause a failure of the injection unit. Moreover, there is another problem in that urea crystals adhere to an exhaust tube which discharges the exhaust gas to cause clogging of the exhaust tube.

In consideration thereof, an occurrence of a failure of a cooling unit may conceivably be prevented by separately providing a cooling system which forcibly cools the injection unit for a certain period of time after the engine is stopped. Examples of a cooling system include: (1) a system which forcibly circulates cooling water using an electric pump or a hydraulic pump; (2) a system which injects cooling air to the injection unit; and (3) a system which forcibly circulates urea water. However, the following problems arise when adopting these systems.

(1) System which Forcibly Circulates Cooling Water

This system is realized by constructing a cooling system which circulates cooling water separately from a cooling system of the engine. However, this cooling system requires that a pump such as an electric pump or a hydraulic pump be added to circulate the cooling water. Therefore, a problem arises in that the risk of a failure of the entire apparatus increases in proportion to the addition of the pump.

In addition, while achieving a failsafe operation requires the use of a sensor to detect whether or not the pump is normally driven, in this case, reliability of the sensor must be evaluated.

Furthermore, when an electric pump is adopted as the pump, power must be supplied from a battery to drive the electric pump. However, operating the electric pump for an extended period of time while the engine is stopped creates a problem of a higher risk of the battery running out. Moreover, detecting a dead battery necessitates separately providing a current sensor for detecting an amount of current of the battery.

On the other hand, when a hydraulic pump is adopted as the pump, since power for the engine cannot be obtained, a pressure accumulation apparatus such as an accumulator must be provided. Therefore, the number of devices increases, which leads to an increase in failure risk as well as in cost.

(2) System which Forcibly Supplies Cooling Air to Injection Unit

This system requires a fan for supplying cooling air to the injection unit, an electric motor for driving the fan, and the like. Therefore, in a similar manner to a case of adopting the system described in (1), there is a problem of a dead battery and a problem in that failure risk increases in exchange for the addition of apparatuses.

(3) System which Forcibly Circulates Urea Water

Urea water is often force-fed by a power source which does not rely on driving of the engine. Therefore, even after the engine is stopped, a cooling effect of the urea water can be expected by forcibly circulating the urea water to the injection unit.

However, since it is highly likely that water content in the urea water evaporates to cause deposition and solidification of urea crystals in a high-temperature environment, the possibility of clogging of urea water piping from a tank which stores the urea water to an injection port which injects the urea water and the injection port is also high.

From the above, adopting a system which forcibly cools the injection unit after the engine is stopped is not reasonable from the perspectives of failure risk, cost, and the like.

In order to prevent such failures of the injection unit, the operator desirably stops the engine after confirming that the temperature of the injection unit has dropped to a level at which failures do not occur.

To this end, when the temperature of exhaust gas has risen to a temperature at which failures of the injection unit occur upon stopping the engine, it is effective to have the operator execute cooling (for example, an idle operation) in order to cool the injection unit.

In consideration thereof, the present invention provides the following techniques. Embodiments of the present invention will now be described.

First Embodiment

FIG. 1 is an external view of a crawler crane X1 in a case where a construction machine according to an embodiment of the present invention is applied to the crawler crane X1. While a description of an example of the crawler crane X1 will be presented below, the present invention is not limited thereto and is applicable to a wheel crane, an excavator, and other construction machines equipped with an exhaust purification function. As shown in FIG. 1, the crawler crane X1 includes an upper rotating body 2 and a lower traveling body 3.

The upper rotating body 2 includes a revolving frame 4 and a work apparatus 6 mounted on top of the revolving frame 4. The work apparatus 6 is used for performing suspending work (a crane operation) with respect to a suspended load. Specifically, the work apparatus 6 includes a boom 8, a lifting rope 10, a hook apparatus 12, a lifting winch 14, a gantry 16, a guy-line 18, an upper spreader 20, a lower spreader 22, a hoisting rope 24, and a hoisting winch 26.

The boom 8 is hoistably attached to a front part of the revolving frame 4 and the hook apparatus 12 for suspending a suspended load via the lifting rope 10 is suspended from a tip of the boom 8. The lifting winch 14 is mounted on the revolving frame 4 and winds up or down the hook apparatus 12 by taking up or feeding out the lifting rope 10. The gantry 16 is erected on top of a rear part of the revolving frame 4. The guy-line 18 has one end connected to a tip part of the boom 8 and another end connected to the upper spreader 20. The lower spreader 22 is provided on an upper end part of the gantry 16, and the lower spreader 22 and the upper spreader 20 are arranged separated from each other. The hoisting rope 24 is wound on the upper spreader 20 and the lower spreader 22. The hoisting winch 26 is mounted on the revolving frame 4 and reduces or increases a distance of separation of the upper spreader 20 with respect to the lower spreader 22 by taking up or feeding out the hoisting rope 24. The boom 8 is hoisted as the distance of separation between both spreaders 20 and 22 is reduced or increased.

A cabin 9 to be boarded by an operator is provided in front of the upper rotating body 2. Glass is provided on a front surface and side surfaces of the cabin 9, and the operator views a peripheral environment through the glass and operates the crawler crane X1. The cabin 9 is provided with a seat on which the operator is to sit, a lever operating unit for operating the crawler crane X1, an accelerator operating unit for adjusting output of an engine, a monitor on which information such as an operating status of the crawler crane X1 is to be displayed, and the like.

Figure 2:
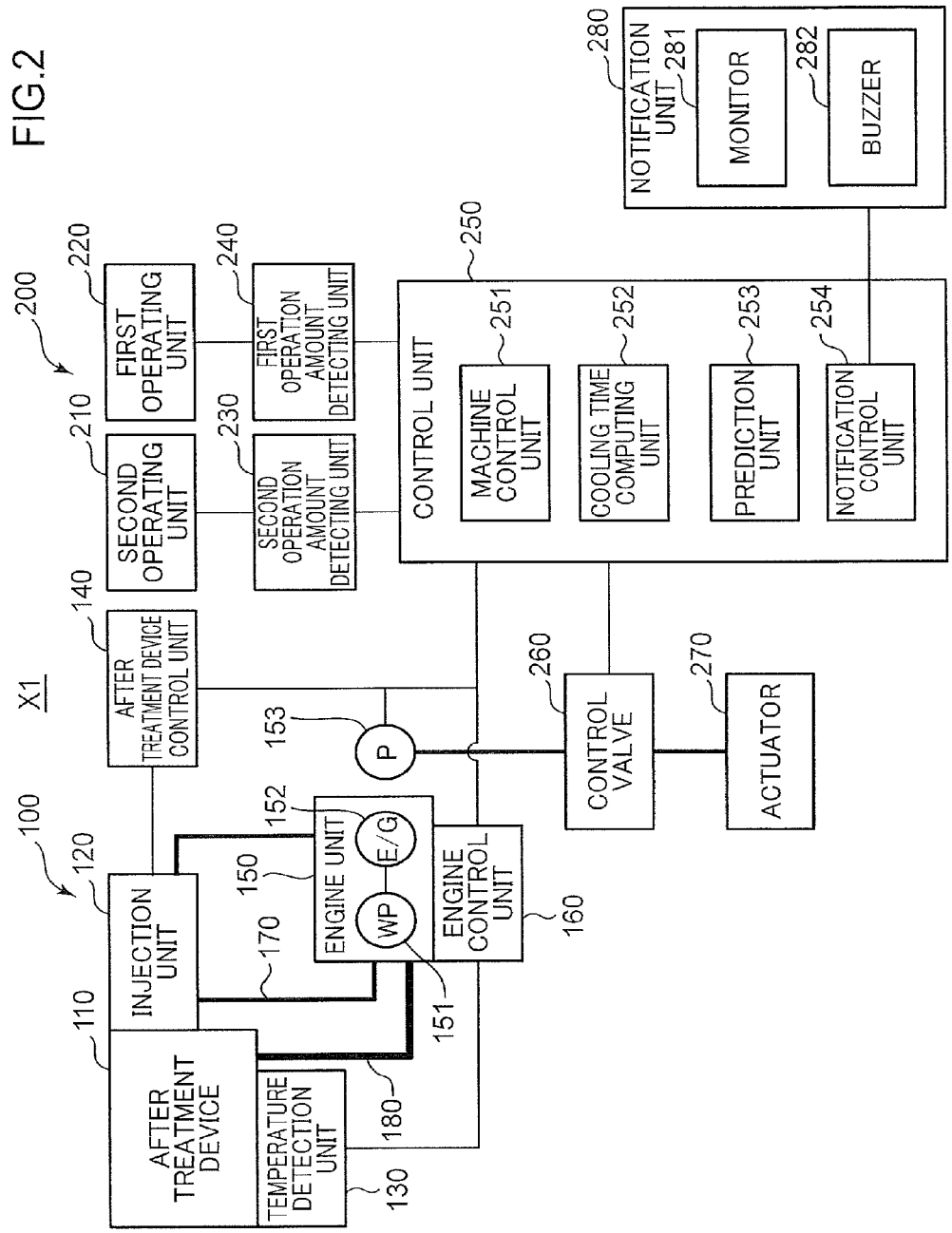
FIG. 2 is a block diagram showing a configuration of the crawler crane shown in FIG. 1.

FIG. 2 is a block diagram showing a configuration of the crawler crane X1 shown in FIG. 1. The crawler crane X1 includes an engine-side apparatus 100 to function as a drive source of the crawler crane X1 and a machine-side apparatus 200 which controls a mechanical configuration of the crawler crane X1.

The engine-side apparatus 100 includes an after treatment device 110, an injection unit 120, a temperature detection unit 130, an engine unit 150, a hydraulic pump (P) 153, and an engine control unit 160.

The after treatment device 110 is connected to an engine 152 of the engine unit 150 via an exhaust tube 180. Exhaust gas discharged from the engine 152 is discharged into air through the exhaust tube 180 and the after treatment device 110. In addition, the after treatment device 110 is connected to the injection unit 120. Furthermore, the after treatment device 110 purifies the exhaust gas discharged from the engine 152 using a reducing agent injected from the injection unit 120.

Specifically, the after treatment device 110 includes a catalytic apparatus which reduces nitrogen monoxide (NO) and increases nitrogen dioxide (NO2) among nitrogen oxides (NOx) in the exhaust gas from the engine 152, a DPF apparatus which collects particulate matter contained in the exhaust gas from the engine 152 and which incinerates the collected particulate matter, and an SCR apparatus which hydrolyzes the reducing agent injected from the injection unit 120 and which reduces NOx contained in the exhaust gas to nitrogen and water. Accordingly, exhaust gas from which NOx and particulate matter have been removed is discharged from the after treatment device 110.

The injection unit 120 which injects a reducing agent into the after treatment device 110 is connected to the after treatment device 110. The injection unit 120 includes a reducing agent tank which stores the reducing agent, a reducing agent pump which pumps up the reducing agent from the reducing agent tank, and an injection valve which injects the reducing agent pumped up by the reducing agent pump to the exhaust gas in the after treatment device 110.

The temperature detection unit 130 is constituted by, for example, a temperature sensor and is connected to the after treatment device 110, and detects a temperature of the exhaust gas in the after treatment device 110. However, this is merely an example and the temperature detection unit 130 may detect a temperature of a periphery of the after treatment device 110. In this case, the temperature detection unit 130 may be connected to the exhaust tube 180 and detect a temperature of the exhaust tube 180 as a temperature of a periphery of the after treatment device 110. In other words, in the present invention, the temperature of the after treatment device 110 includes a temperature of a periphery of the after treatment device 110 in addition to a temperature inside the after treatment device 110.

An after treatment device control unit 140 controls the injection unit 120 so that a necessary amount of the reducing agent is injected in accordance with the temperature of the exhaust gas or the like detected by the temperature detection unit 130. In this case, for example, the after treatment device control unit 140 may control an amount of the reducing agent injected from the injection unit 120 by controlling opening of an injection valve.

The engine unit 150 includes the engine (E/G) 152 and a cooling pump (WP) 151 connected to a driving shaft of the engine 152.

The engine 152 is constituted by, for example, a diesel engine, and drives a cooling pump 151 and a hydraulic pump 153.

The cooling pump 151 is driven by the engine 152 and causes cooling water to circulate in cooling piping 170. The hydraulic pump 153 is driven by the engine 152 and discharges operating oil. The operating oil discharged from the hydraulic pump 153 is supplied to an actuator 270 via a control valve 260.

The engine control unit 160 controls the engine unit 150. The engine control unit 160 acquires temperature data detected by the temperature detection unit 130 and outputs the acquired temperature data to the after treatment device control unit 140 and a control unit 250. In addition, the engine control unit 160 controls the number of revolutions of the engine 152 in accordance with a command from the control unit 250. In other words, the engine control unit 160 transmits and receives information to and from the temperature detection unit 130, the after treatment device control unit 140, and the control unit 250. Furthermore, a discharge amount of the hydraulic pump 153 is controlled by the control unit 250.

Moreover, in the present embodiment, it is assumed that the cooling pump 151 is driven when the engine 152 is being driven and the cooling pump 151 is stopped when the engine 152 is stopped. Therefore, when the engine 152 is being driven, the cooling water circulates through the cooling piping 170 and the engine unit 150, the injection unit 120, and the after treatment device 110 are cooled.

The cooling piping 170 is a circulation path which causes the cooling water to circulate and which is connected between the engine unit 150 and the injection unit 120. The cooling piping 170 includes a radiator which cools the cooling water, and supplies the injection unit 120 with the cooling water cooled by the radiator to cool the injection unit 120.

The machine-side apparatus 200 includes a second operation unit 210, a first operation unit 220, a second operation amount detecting unit 230 (an example of the state detection unit), an first operation amount detecting unit 240 (an example of the state detection unit), the control unit 250, the control valve 260, the actuator 270, and a notification unit 280.

The second operation unit 210 is constituted by, for example, a lever-type operation apparatus and accepts operations by the operator for operating the actuator 270. As the second operation unit 210, for example, a boom operation lever for hoisting the boom 8, a wind-up lever for moving the hook apparatus 12 up and down, a revolving lever for causing the upper rotating body 2 to revolve, or the like is adopted.

The first operation unit 220 is constituted by, for example, an accelerator dial or an accelerator pedal and accepts operations by the operator for adjusting the number of revolutions of the engine 152.

The second operation amount detecting unit 230 is constituted by, for example, a potentiometer and detects an angle of inclination of the second operation unit 210 as an operation amount of the second operation unit 210. When the second operation unit 210 is, for example, an operation lever which is tilted toward the front and toward the rear from a central neutral position, the second operation amount detecting unit 230 detects an angle of inclination of the second operation unit 210 toward the front and an angle of inclination of the second operation unit 210 toward the rear as operation amounts.

The first operation amount detecting unit 240 is constituted by, for example, a potentiometer and detects an angle of operation of the first operation unit 220 as an operation amount of the first operation unit 220.

The control valve 260 is constituted by, for example, a solenoid control valve and supplies operating oil discharged from the hydraulic pump 153 to the actuator 270 under control by the control unit 250.

The actuator 270 is constituted by, for example, a hydraulic motor or a hydraulic cylinder driven by the operating oil supplied from the control valve 260. Examples of the actuator 270 include a hydraulic motor for driving the hoisting winch 26 which hoists the boom 8, a hydraulic motor for driving the lifting winch 14 which moves the hook apparatus 12 upward and downward, and a hydraulic motor which causes the upper rotating body 2 to revolve.

The control unit 250 includes a machine control unit 251, a cooling time computing unit 252, a prediction unit 253, and a notification control unit 254.

The machine control unit 251 controls the control valve 260 and drives the actuator 270 based on an operation amount detected by the second operation amount detecting unit 230. For example, when an operation amount of a boom operation lever detected by the second operation amount detecting unit 230 indicates an operation amount exceeding a neutral position, the machine control unit 251 determines that the boom operation lever has been operated, supplies operating oil to the hoisting winch 26 from the control valve 260, and hoists the boom 8.

In addition, the machine control unit 251 outputs, to the engine control unit 160, a command for driving the engine 152 at the number of revolutions in accordance with an operation amount detected by the first operation amount detecting unit 240. Accordingly, the operator can drive the engine 152 at the number of revolutions in accordance with an operation amount of the first operation unit 220.

The cooling time computing unit 252 computes a cooling time during which a temperature of the exhaust gas discharged from the engine 152 drops to or below a certain value based on the temperature detected by the temperature detection unit 130. The cooling time is a period of time required for the temperature of the injection unit 120 to drop to a temperature at which failures do not occur.

When the temperature detected by the temperature detection unit 130 is higher than a prescribed temperature, the cooling time computing unit 252 periodically increments the cooling time by a prescribed increment value. On the other hand, when the temperature detected by the temperature detection unit 130 is lower than the prescribed temperature, the cooling time computing unit 252 periodically decrements the cooling time by a prescribed decrement value.

The prediction unit 253 predicts that the possibility of the engine 152 to be stopped is high when an operation amount of the second operation unit 210 as detected by the second operation amount detecting unit 230 and an operation amount of the first operation unit 220 as detected by the first operation amount detecting unit 240 satisfy prescribed conditions. In this case, prescribed conditions refer to cases satisfying one of or both a condition that the operation amount detected by the first operation amount detecting unit 240 indicates that an operation of the first operation unit 220 is not being performed and a condition that the operation amount detected by the second operation amount detecting unit 230 indicates that an operation of the second operation unit 210 is not being performed.

The notification control unit 254 uses the notification unit 280 to notify the operator of the necessity of cooling before the engine 152 is stopped during the cooling time computed by the cooling time computing unit 252. At this point, for example, the notification control unit 254 may notify the operator of the necessity of cooling when the prediction unit 253 predicts that the engine 152 is to be stopped.

The notification unit 280 includes a monitor 281 and a buzzer 282. The monitor 281 is constituted by a display apparatus provided inside the cabin 9 and displays an image for notifying the operator of a state of the crawler crane X1. In particular, in the present embodiment, the monitor 281 displays an image of an alarm lamp under the control of the notification control unit 254. In this case, the notification control unit 254 may place the image of the alarm lamp in a lighted state during the cooling time.

Moreover, while a description is provided of the notification control unit 254 placing an alarm lamp displayed on the monitor 281 in a lighted state, this is simply an example and a physical alarm lamp provided inside the cabin 9 may be placed in a lighted state.

In addition, the notification control unit 254 may display the cooling time itself on the monitor 281. In this case, the notification control unit 254 may adopt a mode in which the cooling time is displayed as a numerical value or a mode in which the cooling time is notified using an icon of an hourglass.

The buzzer 282 is constituted by a buzzer for sounding an alarm tone. For example, the notification control unit 254 causes the buzzer 282 to output an alarm tone upon start of the cooling time and causes the buzzer 282 to output an alarm tone upon end of the cooling time.

Figure 3:
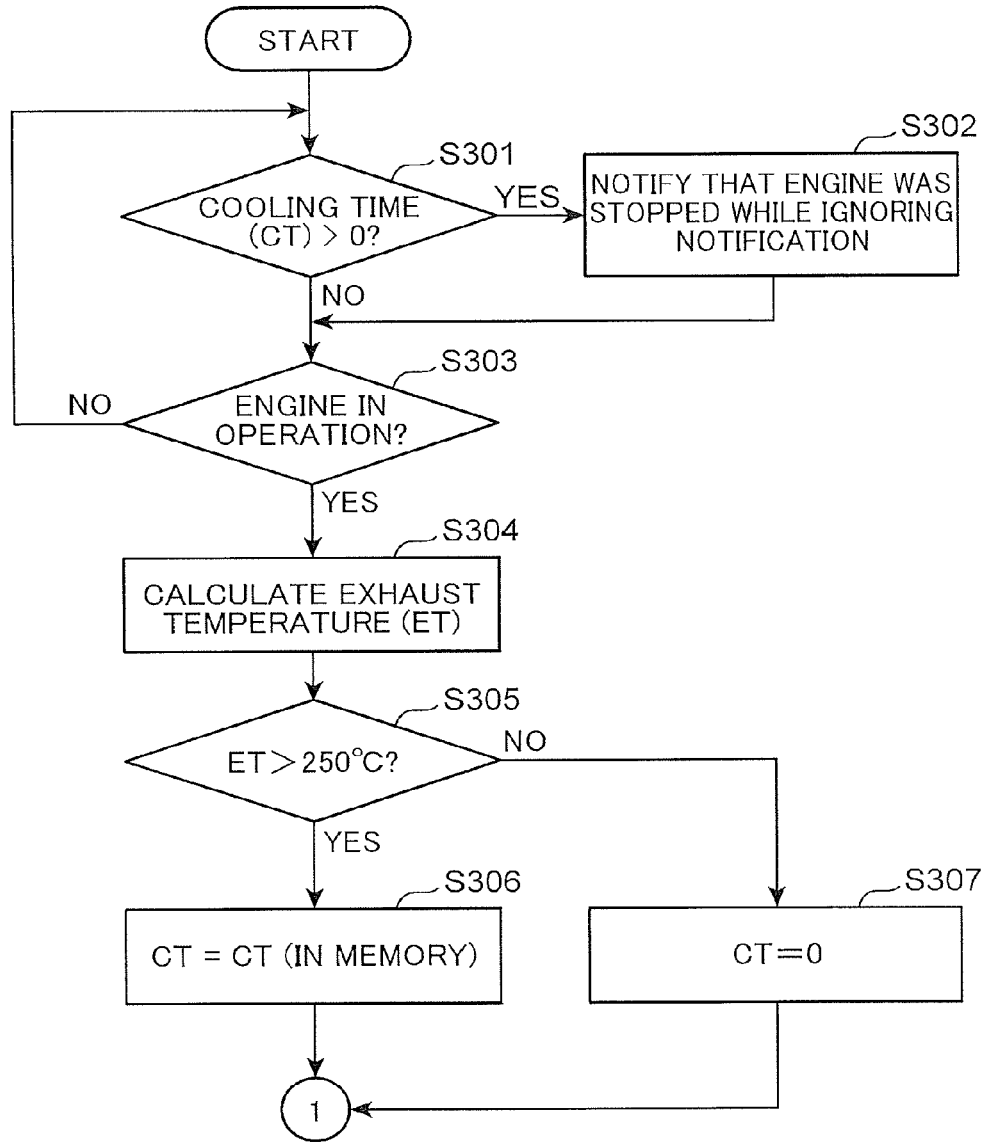
FIG. 3 is a flow chart showing an example of processing of a crawler crane according to a first embodiment of the present invention.
Figure 4:
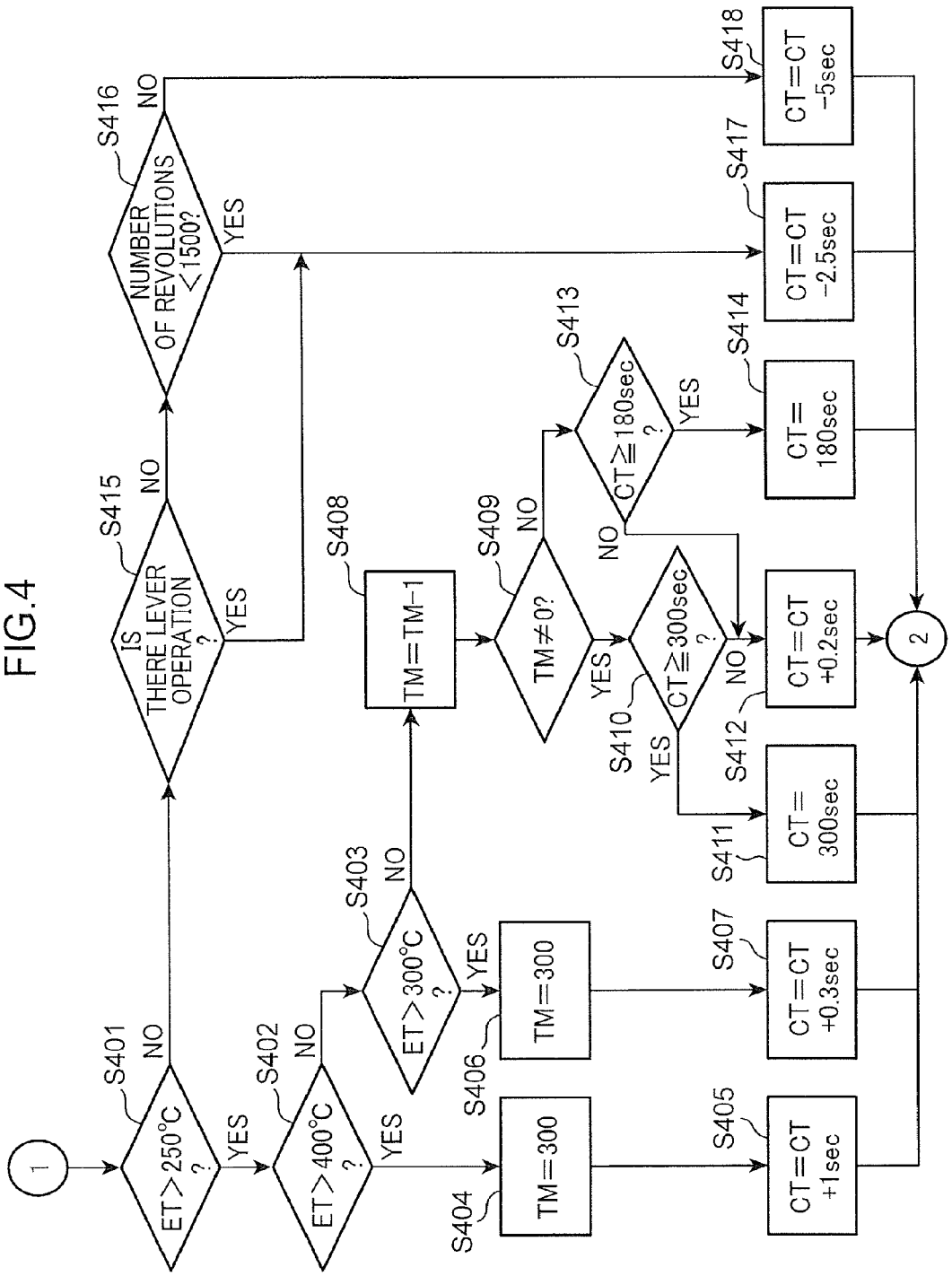
FIG. 4 is a flow chart representing a continuation of FIG. 3.

FIGS. 3 to 5 are flow charts showing an example of processing of the crawler crane X1 according to the first embodiment of the present invention. Moreover, the flow charts shown in FIGS. 3 to 5 are started when an ignition key is turned on, and processes from S401 shown in FIG. 4 to S508 shown in FIG. 5 are periodically repeated during driving of the engine 152. While the present flow charts adopt one second as a period over which the processes are repeated, this is simply an example.

First, the notification control unit 254 determines whether or not a cooling time CT upon a previous stoppage of the engine 152 stored in a ROM (not shown) is longer than 0 (S301). When the cooling time is longer than 0 (YES in S301), the notification control unit 254 determines that the operator had previously stopped the engine while ignoring a cooling notification and notifies the notification unit 280 to that effect (S302). At this point, for example, the notification control unit 254 may cause the monitor 281 to display a text such as "The engine was previously stopped without cooling. Please be more careful next time." or may output audio representing the text from a speaker (not shown).

In S303, when the engine 152 is in operation (YES in S303), the cooling time computing unit 252 calculates an exhaust temperature ET which is a temperature of exhaust gas based on a temperature detected by the temperature detection unit 130. At this point, the cooling time computing unit 252 may calculate the exhaust temperature ET by averaging a plurality of pieces of temperature information detected by the temperature detection unit 130 within a certain period in the past from the present. Accordingly, calculation of an excessively long or excessively short cooling time CT due to a temporary erroneous temperature detection by the temperature detection unit 130 can be prevented.

On the other hand, when the engine 152 is not in operation (NO in S303), the processing returns to S301. In addition, the cooling time computing unit 252 may determine that the engine 152 is in operation when the number of revolutions of the engine 152 is equal to or larger than a prescribed value.

In S305, when the exhaust temperature ET is higher than 250 degrees (Celsius; same below) (YES in S305), the cooling time computing unit 252 sets a cooling time CT stored in the ROM as the current cooling time CT (S306). This is done in order to impart an offset to the cooling time CT and to ensure that the operator is notified of the necessity of cooling in cases such as when, after the engine 152 is turned off while ignoring a cooling notification despite cooling being necessary, the engine 152 is immediately turned back on.

On the other hand, when the exhaust temperature ET is not higher than 250 degrees (NO in S305), the cooling time computing unit 252 sets the cooling time to "0" (S307).

Referring to FIG. 4, when the exhaust temperature ET is not higher than 250 degrees (NO in S401), the second operation unit 210 has not been operated (NO in S415), and the number of revolutions of the engine 152 is not smaller than 1500 $min^{-1}$ (NO in S416), the cooling time computing unit 252 decrements the cooling time CT by 5 seconds (S418). In this case, 1500 $min^{-1}$ is a threshold for determining whether or not a present state is an idle state in which the first operation unit 220 is not being operated (a low idle state), and a different value is adopted in accordance with a type of the engine 152 or a type of the crawler crane X1 to which the engine 152 is applied.

On the other hand, when the number of revolutions of the engine 152 is smaller than 1500 $min^{-1}$ (YES in S416) regardless of whether or not the second operation unit 210 has been operated (S415), the cooling time computing unit 252 decrements the cooling time CT by 2.5 seconds (S417).

When the temperature of the exhaust gas is not higher than 250 degrees (NO in S401), since a risk of failure of the injection unit 120 is low, the cooling time CT is basically decremented by 2.5 seconds. However, when the second operation unit 210 has not been operated and the number of revolutions is not smaller than 1500 $min^{-1}$ (NO in S415 and NO in S416), since the engine 152 is in a so-called high idle state and a cooling effect of flowing exhaust gas is high, the cooling time CT is decremented by 5 seconds. Accordingly, for example, during the cooling time CT, the operator can reduce the cooling time CT by operating the first operation unit 220 to drive the engine 152. As a result, the operator can finish cooling quickly and a standby time of the operator for cooling can be shortened.

When the exhaust temperature ET is higher than 250 degrees but not higher than 300 degrees (YES in S401, NO in S402, and NO in S403), the cooling time computing unit 252 decrements a flag TM by 1 (S408). In addition, when the flag TM is 0 (NO in S409) and the cooling time CT is equal to or longer than 180 seconds (YES in S413), the cooling time computing unit 252 sets the cooling time CT to 180 seconds. A description of the flag TM will be given later.

On the other hand, when the cooling time CT is not equal to or longer than 180 seconds (NO in S413), the cooling time computing unit 252 increments the cooling tune CT by 0.2 seconds (S412). Accordingly, when the exhaust temperature ET is within a range of 250 degrees to 300 degrees and the flag TM is 0, the cooling time CT is incremented by 0.2 seconds with 180 seconds as an upper limit value. As a result, the cooling time CT can be prevented from increasing infinitely.

In S409, when the flag TM is not 0 (YES in S409) and the cooling time CT is not equal to or longer than 300 seconds (NO in S410), the cooling time computing unit 252 increments the cooling time CT by 0.2 seconds (S412). On the other hand, when the cooling time CT is equal to or longer than 300 seconds (YES in S410), the cooling time computing unit 252 sets the cooling time CT to 300 seconds (S411).

Accordingly, when the exhaust temperature ET is within a range of 250 degrees to 300 degrees and the flag TM is not 0, the cooling time CT is incremented by 0.2 seconds with 300 seconds as an upper limit value. As a result, the cooling time CT is prevented from increasing infinitely.

In this case, the upper limit value (=300 seconds) of the flag TM when the flag TM is not 0 is set higher than when the flag TM is 0 in consideration of the fact that the exhaust temperature ET had exceeded 300 degrees in the last five minutes and that a long time is required to cool the injection unit 120.

When the exhaust temperature ET is not higher than 400 degrees but higher than 300 degrees (NO in S402 and YES in S403), the cooling time computing unit 252 sets the flag TM to "300" (S406) and increments the cooling time CT by 0.3 seconds (S407). Accordingly, when the exhaust temperature ET is within a range of 300 degrees to 400 degrees, the cooling time CT is to be incremented by 0.3 seconds.

In this case, when the exhaust temperature ET had exceeded 300 degrees in the last five minutes, the value of the flag TM is set (=300). Therefore, even when the exhaust temperature ET is within a range of 250 degrees to 300 degrees, in a case where the exhaust temperature ET had exceeded 300 degrees in the last five minutes, the process of S408 is repeated 300 times to secure a cooling time CT of at least 5 minutes.

When the exhaust temperature ET is higher than 400 degrees (YES in S402), the cooling time computing unit 252 sets the flag TM to 300 (S404) and increments the cooling time CT by 1 second (S405).

Accordingly, when the exhaust temperature ET is higher than 400 degrees, the cooling time CT is to be incremented by 1 second.

As described above, in the processing shown in FIG. 4, since the cooling time CT is decremented by a prescribed value (5 seconds or 2.5 seconds) when the exhaust temperature ET is equal to or lower than 250 seconds, the cooling time can be reduced to 0. In addition, when the exhaust temperature ET is higher than 250 degrees, since the higher the exhaust temperature ET, the larger the value by which the cooling time CT is incremented, an increment of the cooling time CT can be increased when the exhaust temperature ET is higher. Therefore, an appropriate cooling time CT in accordance with the exhaust temperature ET can be set.

Reference will now be made to FIG. 5. In S501, the prediction unit 253 determines whether or not the notification unit 280 is turned on. In this case, the notification unit 280 being turned on refers to a state where the notification unit 280 is notifying the operator of the necessity of cooling. Specifically, this corresponds to a lighted state of the alarm lamp.

In S501, when the notification unit 280 is turned off (NO in S501), the prediction unit 253 determines whether or not the cooling time CT is equal to or longer than 60 seconds (S504). When the cooling time CT is equal to or longer than 60 seconds (YES in S504), the prediction unit 253 determines whether or not an operation amount detected by the first operation amount detecting unit 240 indicates that there is no accelerator operation and an operation amount detected by the second operation amount detecting unit 230 indicates that there is no lever operation (S505, S506).

When neither an accelerator operation nor a lever operation has been performed (NO in S505 and NO in S506), the prediction unit 253 determines that the possibility of the engine 152 to be stopped is high. In this case, the notification control unit 254 turns on the notification unit 280 (S507). In addition, in this case, the notification control unit 254 places the alarm lamp in a lighted state and, at the same time, causes the buzzer 282 to output an alarm tone for a prescribed period of time (for example, 2 or 3 seconds). Accordingly, notification of cooling to the operator is started.

On the other hand, when the cooling time CT is not equal to or longer than 60 seconds (NO in S504), the notification control unit 254 does not turn on the notification unit 280 and advances the processing to S508. In addition, in a case where one of an accelerator operation and a lever operation has been performed (YES in S505 or YES in S506) when the cooling time CT is equal to or longer than 60 seconds (YES in S504), the prediction unit 253 determines that the possibility of the engine 152 to be stopped is low. In this case, the notification control unit 254 does not turn on the notification unit 280 and advances the processing to S508.

Even when a load on the engine 152 due to an operation is low, the exhaust temperature ET may rise instantaneously and the cooling time CT may be set to a value of several seconds. In such a case, turning on the notification unit 280 every time may result in the notification unit 280 being turned on frequently and may confuse the operator. In consideration thereof, in S504, a threshold of 60 seconds is provided, and the notification unit 280 is configured not to be turned on when the cooling time CT is not equal to or longer than 60 seconds (NO in S504).

In addition, when an accelerator operation or a lever operation is being performed, since the operator is engaged in an operation and the possibility of the engine to be stopped is low, the notification unit 280 is configured not to be turned on when YES in S505 or YES in S506. Accordingly, an occurrence of a situation where a cooling notification is started during an operation of the crawler crane X1 and causes the operator to lose concentration can be prevented.

In a case where the cooling time CT is "0" (YES in S502) when the notification unit 280 has been turned on in S501 (YES in S501), since cooling has been finished, the notification control unit 254 turns off the notification unit 280 (S503). In this case, the notification control unit 254 may turn off the alarm lamp, and cause the buzzer 282 to output an alarm tone for a prescribed period of time (for example, 2 or 3 seconds) to notify the operator that the cooling time CT has expired.

On the other hand, when the cooling time CT is not "0" (NO in S502), the notification control unit 254 advances the processing to S508, does not turn off the notification unit 280, and continues cooling notification.

In S508, when the engine 152 is stopped by the operator (YES in S508), the notification control unit 254 determines that the operator has stopped the engine 152 while ignoring a cooling notification if the notification unit 280 is turned on (YES in S509), and issues a notification to that effect (S510). In this case, the notification control unit 254 may cause the monitor 281 to display a message such as "The engine was previously stopped without cooling. Please be more careful next time."

In S508, when the engine 152 is not stopped by the operator (NO in S508), the processing is returned to S401 and the processes of S401 and thereafter are repeatedly executed. Accordingly, during the operation of the engine 152, processing involving incrementing or decrementing the cooling time CT based on exhaust gas temperature is repeated.

In S509, when the notification unit 280 is not turned on (NO in S509), the cooling time computing unit 252 saves the cooling time CT in the ROM (S511) and ends the processing. Accordingly, the cooling time CT when the engine 152 is stopped is saved in the ROM to be utilized in the process of S306 in FIG. 3.

As described above, according to the present embodiment, when the exhaust temperature ET is higher than 250 degrees (YES in S401), the cooling time CT is increased such that the higher the exhaust temperature ET, the larger the increment value (S405, S407, S412). In addition, in a case where the cooling time CT is longer than 60 seconds (YES in S504) and a determination is made that the possibility of the engine 152 to be stopped is high (NO in S505 and NO in S506), the notification unit 280 is turned on (S507). Therefore, cooling can be performed by the operator before the engine 152 is stopped.

Furthermore, when the exhaust temperature ET is equal to or lower than 250 degrees (NO in S401), since the cooling time CT is decremented if cooling is being performed (S417, S418) and cooling notification is turned off once the cooling time CT is down to 0 (S503), the operator can be notified of an expiration timing of the cooling time CT.

Second Embodiment

The crawler crane X1 according to a second embodiment differs from that of the first embodiment in a condition applied when decrementing the cooling time CT. Moreover, in the present embodiment, same components as the first embodiment will be denoted by same reference numerals and a description thereof will be omitted.

A difference between the second embodiment and the first embodiment is represented in the flow chart shown in FIG. 4. FIG. 6 is a flow chart showing an example of processing of the crawler crane X1 according to the second embodiment of the present invention. In FIG. 6, compared with FIG. 4, a process of S601 has been added while the processes of S416 and S418 have been deleted. In addition, in FIG. 6, since S415 differs from that shown in FIG. 4 due to S601 being provided, a reference character "a" is appended.

When the exhaust temperature ET is not higher than 250 degrees (NO in S401) and neither an accelerator operation nor a lever operation has been performed (NO in S601 and NO in S415a), the cooling time computing unit 252 decrements the cooling time CT by 2.5 seconds (S417).

On the other hand, when one of an accelerator operation and a lever operation has been performed (YES in S601 or YES in S415a), the cooling time computing unit 252 returns the processing to S401.

That is, in FIG. 6, the cooling time CT is decremented (S417) only when neither an accelerator operation nor a lever operation is being performed or, in other words, only when the operator is not performing an operation. Since the injection unit 120 is cooled when neither an accelerator operation nor a lever operation is being performed, the cooling time CT is favorably decremented. Accordingly, the cooling time CT can be prevented from becoming unnecessarily extended.

Moreover, the following modifications of the present invention can be adopted.

(First Modification)

A feature of the first modification is that a cooling switch for causing cooling to be automatically started is provided. In this case, when notifying cooling, the notification control unit 254 may cause the monitor 281 to display the cooling switch. Subsequently, when the cooling switch is pressed, the notification control unit 254 issues a command to the engine control unit 160 to operate at a predetermined optimal number of revolutions for performing cooling. Accordingly, the engine control unit 160 causes the engine 152 to operate at an optimal number of revolutions. In this case, as the optimal number of revolutions, a value can be adopted which enables both promotion of cooling and fuel consumption to assume optimal values in consideration of a balance between promotion of cooling and fuel consumption.

In addition, in the first modification, a configuration which automatically stops the engine 152 when the cooling time CT reaches 0 can be adopted. This allows the operator to step away from the crawler crane X1 once cooling starts.

(Second Modification)

The cooling time CT may be provided as time for cooling the engine 152 as well as operating oil in addition to cooling the injection unit 120. In this case, a condition that a temperature of cooling water flowing through the cooling piping 170 is equal to or lower than a reference temperature and a condition that a temperature of operating oil is equal to or lower than a reference temperature may be added as end conditions of cooling.

In this case, when the crawler crane X1 performs a high-load operation, the temperature of the cooling water and the temperature of the operating oil enter a high-temperature state. When the engine 152 is stopped in this state, since circulation of the cooling water and rotation of a cooling fan (not shown) of the engine 152 are stopped, the engine 152 is no longer cooled. In addition, since circulation of the operating oil and rotation of an oil cooler fan (not shown) are also stopped, the operating oil is no longer cooled. Accordingly, the engine 152 sustains damage and deterioration of the operating oil progresses. In consideration thereof, by adding the conditions described above to the end condition of the cooling time CT, an occurrence of such situations can be prevented.

(Third Modification)

A function which prevents the engine 152 from being stopped when the notification unit 280 is turned on may be provided. In this case, the notification control unit 254 may issue a command to the engine control unit 160 to continue operation of the engine 152 even when an operation for stopping the engine 152 is input by the operator.

Accordingly, even when an operation for stopping the engine 152 is mistakenly or intentionally input by the operator, a risk of failure of the injection unit 120 can be reduced.

(Fourth Modification)

Moreover, while the after treatment device 110 includes a DPF apparatus in the embodiments described above, the DPF apparatus may be omitted.

SUMMARY OF EMBODIMENTS

A construction machine according to an aspect of the present invention is a construction machine equipped with an exhaust purification function, the construction machine including:

an engine;

an injection unit which injects a reducing agent for removing nitrogen oxides in exhaust gas discharged from the engine;

an after treatment device which is connected to the injection unit and which purifies the exhaust gas discharged from the engine using the injected reducing agent;

a temperature detection unit which detects a temperature of the after treatment device;

a cooling time computing unit which computes a cooling time based on the temperature detected by the temperature detection unit, the cooling time being a period of time during which cooling of the injection unit is performed with the exhaust gas discharged from the engine; and a notification unit which notifies an operator of a necessity of the cooling before stopping the engine during the cooling time computed by the cooling time computing unit.

According to this configuration, since the necessity of cooling is notified before the engine is stopped, the operator can be caused to perform cooling of the injection unit before the engine is stopped. Therefore, a situation where the engine is stopped despite the injection unit being in a high-temperature state can be prevented and a risk of failure of the injection unit can be reduced.

In addition, since the necessity of cooling is notified during the cooling time, the operator can be notified of an end timing of the cooling.

Furthermore, in the aspect described above, the cooling time computing unit may increment the cooling time by a prescribed increment value when the temperature detected by the temperature detection unit is higher than a prescribed temperature, and the cooling time computing unit may decrement the cooling time by a prescribed decrement value when the temperature detected by the temperature detection unit is lower than the prescribed temperature.

As exemplified by the fact that the temperature of the exhaust gas rises when a load on the construction machine is high and the temperature of the exhaust gas drops when a load on the construction machine is low, the temperature of the exhaust gas changes in accordance with states of the construction machine. In the present aspect, since the cooling time is incremented by a prescribed increment value when the temperature of the exhaust gas is higher than a prescribed temperature, the cooling time can be extended. On the other hand, since the cooling time is decremented by a prescribed decrement value when the temperature of the exhaust gas is lower than the prescribed temperature, the cooling time can be shortened. Therefore, by driving the engine so that the temperature of the exhaust gas is lower than the prescribed temperature, the operator can shorten the cooling time and end cooling.

The aspect described above may further include a cabin to be boarded by the operator, wherein the notification unit may include a monitor which is provided inside the cabin and which notifies a necessity of the cooling.

According to this configuration, the operator can confirm whether or not cooling is necessary through the monitor before stopping the engine.

In the aspect described above, the notification unit may further include a buzzer which is provided inside the cabin and which notifies a necessity of the cooling by an alarm tone.

Since various types of information are displayed on the monitor, information notifying the necessity of cooling may become hidden by other pieces of information. In addition, with a construction machine, the operator often performs work while focusing on a suspended load instead of focusing on the monitor. In the present aspect, since the necessity of cooling is notified by an alarm tone, even when the operator is unable to confirm the necessity of cooling on the monitor or when the operator does not check the monitor, the operator can be prevented from stopping the engine before the cooling time lapses.

The aspect described above may further include:

a state detection unit which detects a state of the construction machine; and a prediction unit which predicts a stoppage of the engine when the state detected by the state detection unit satisfies a prescribed condition, wherein the notification unit may notify a necessity of the cooling when a stoppage of the engine is predicted by the prediction unit.

According to this configuration, since the necessity of cooling is notified when a stoppage of the engine is predicted by the prediction unit, the operator can be prevented from being unnecessarily notified of the necessity of cooling.

The aspect described above may further include:

a first operation unit which is applied an operation to adjust the number of revolutions of the engine, wherein the state detection unit may include a first operation amount detecting unit which detects an operation amount which is an amount of the operation applied to the first operation unit, and the prediction unit may predict a stoppage of the engine when the operation amount detected by the first operation amount detecting unit indicates that no operation is applied to the first operation unit.

According to this configuration, when the first operation amount detecting unit detects that there is no accelerator operation, a stoppage of the engine is predicted and the necessity of cooling is notified. Therefore, an occurrence of a situation where the necessity of cooling is notified during an operation of the construction machine and causes the operator to lose concentration can be prevented.

The aspect described above may further include:

an actuator; and a second operation unit which is applied an operation to move the actuator, wherein the state detection unit may include a second operation amount detecting unit which detects an operation amount of the second operation unit, and the prediction unit may predict a stoppage of the engine when the operation amount detected by the second operation amount detecting unit indicates that no operation is applied the second operation unit.

According to this configuration, when the first operation amount detecting unit detects that there is no operation to the first operation unit and the second operation amount detecting unit detects that there is no operation to the second operation unit, a stoppage of the engine is predicted and the necessity of cooling is notified. Therefore, an occurrence of a situation where the operator loses concentration due to the necessity of cooling being notified during an operation of the construction machine can be prevented.

In the aspect described above, the monitor may notify the cooling time.

According to this configuration, by notifying the cooling time, the operator can become aware of for how many more minutes cooling is to be performed, and stress of the operator on stand-by can be reduced.

The aspect described above may further include:

an actuator;

a first operation unit which is applied an operation to adjust the number of revolutions of the engine;

a second operation unit which is applied an operation to move the actuator;

a first operation amount detecting unit which detects an operation amount which is an amount of the operation applied to the first operation unit; and a second operation amount detecting unit which detects an operation amount which is an amount of the operation applied to the second operation unit, wherein when the operation amount detected by the second operation amount detecting unit indicates that no operation is applied the second operation unit and the number of revolutions of the engine in accordance with the operation amount detected by the first operation amount detecting unit is larger than a prescribed value, the cooling time computing unit may increase the decrement value as compared to when the number of revolutions of the engine is not larger than the prescribed value.

When the second operation unit has not been operated by the operator and the number of revolutions of the engine is larger than a prescribed value (for example, a high idle state), an amount of exhaust gas passing through the injection unit increases and a cooling effect of the injection unit increases. According to this configuration, when the second operation unit has not been operated by the operator and the number of revolutions of the engine is larger than a prescribed value, the decrement value of the cooling time is increased as compared to when the number of revolutions is not larger than the prescribed value. Therefore, the operator can shorten the cooling time by creating, for example, a high idle state.

In the aspect described above, when an operation to stop the engine is detected before the cooling time lapses despite the notification unit having notified a necessity of the cooling, the notification unit may issue a warning.

According to this configuration, since a warning is issued when the operator stops the engine while ignoring a notification of the necessity of cooling, the operator can be reminded to perform cooling.

In the aspect described above, when an operation to stop the engine is detected before the cooling time lapses despite the notification unit has notified a necessity of the cooling, the notification unit may notify the fact that the notification was previously ignored at a time of next start up of the engine.

According to this configuration, when the operator stops the engine while ignoring a notification of the necessity of cooling, since the operator is notified accordingly when the engine is next started, the operator can be prompted to perform cooling in the future.

The aspect described above may further include:

an actuator;

a first operation unit which is applied an operation to adjust the number of revolutions of the engine;

a second operation unit which is applied an operation to move the actuator;

a first operation amount detecting unit which detects an operation amount which is an amount of the operation applied to the first operation unit; and a second operation amount detecting unit which detects an operation amount of the second operation unit, wherein when the operation amount detected by the first operation amount detecting unit indicates that no operation is applied the first operation unit and the operation amount detected by the second operation amount detecting unit indicates that no operation is applied the second operation unit, the cooling time computing unit may reduce the cooling time.

In a state where a determination that the construction machine is not operated can be made, exhaust gas with a low temperature is discharged and cooling of the injection unit is promoted. According to this configuration, in a state where there is no accelerator operation and no lever operation or, in other words, a state where a determination that the construction machine is not operated can be made, the cooling time is reduced. As a result, the operator can perform cooling of the injection unit by not performing an accelerator operation and a lever operation.

This application is based on Japanese Patent application No. 2015-227558 filed in Japan Patent Office on Nov. 20, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine equipped with an exhaust purification function, the construction machine comprising:
   an engine;
   an injector which injects a reducing agent for removing nitrogen oxides in exhaust gas discharged from the engine;
   an after treatment device comprising at least one of an apparatus containing a catalyst capable of reducing nitrogen monoxide, a DPF apparatus and an SCR apparatus, which after treatment device is connected to the injector and which purifies the exhaust gas discharged from the engine using the injected reducing agent;
   a temperature sensor which detects a temperature of the after treatment device;
   a cooling time computing unit comprising a controller which computes a cooling time based on the temperature detected by the temperature sensor, the cooling time being a period of time during which a temperature of the exhaust gas discharged from the engine drops to or below a certain value; and
   a sound or image emitter which notifies an operator of a necessity of cooling before stopping the engine during the cooling time computed by the cooling time computing unit, wherein
   the cooling time computing unit increments the cooling time by a prescribed increment value when the temperature detected by the temperature sensor is higher than a prescribed temperature and decrements the cooling time by a prescribed decrement value when the temperature detected by the temperature sensor is lower than the prescribed temperature.

2. The construction machine according to claim 1, further comprising
   a cabin to be boarded by the operator, wherein
   the sound or image emitter includes a monitor which is provided inside the cabin and which notifies a necessity of the cooling.

3. The construction machine according to claim 1, further comprising:
   an actuator;
   an accelerator dial or pedal to which is applied an operation to adjust a number of revolutions of the engine;
   an apparatus including a lever to which is applied an operation to move the actuator;
   a first operation amount detecting sensor which detects an operation amount which is an amount of the operation applied to the accelerator dial or pedal; and
   a second operation amount detecting sensor which detects an operation amount which is an amount of the operation applied to the apparatus including the lever, wherein
   when the operation amount detected by the second operation amount detecting sensor indicates that no operation is applied to the apparatus including the lever and the number of revolutions of the engine in accordance with the operation amount detected by the first operation amount detecting sensor is larger than a prescribed value, the cooling time computing unit increases the decrement value as compared to when the number of revolutions of the engine is not larger than the prescribed value.

4. The construction machine according to claim 1, further comprising:
   an actuator;
   an accelerator dial or pedal to which is applied an operation to adjust a number of revolutions of the engine;
   an apparatus including a lever to which is applied an operation to move the actuator;
   a first operation amount detecting sensor which detects an operation amount which is an amount of the operation applied to the accelerator dial or pedal; and
   a second operation amount detecting sensor which detects an operation amount of the apparatus including the lever, wherein
   when the operation amount detected by the first operation amount detecting sensor indicates that no operation is applied to the accelerator dial or pedal and the operation amount detected by the second operation amount detecting sensor indicates that no operation is applied to the apparatus including the lever, the cooling time computing unit reduces the cooling time.

5. The construction machine according to claim 2, wherein
   the sound or image emitter further includes a buzzer which is provided inside the cabin and which notifies a necessity of the cooling by an alarm tone.

6. The construction machine according to claim 2, wherein the monitor notifies the cooling time.

7. The construction machine according to claim 1, wherein when an operation to stop the engine is detected before the cooling time lapses despite the sound or image emitter has notified a necessity of the cooling, the sound or image emitter issues a warning.

8. The construction machine according to claim 7, wherein when an operation to stop the engine is detected before the cooling time lapses despite the sound or image emitter has notified a necessity of the cooling, the sound or image emitter notifies the fact that the notification was previously ignored at a time of next start up of the engine.

9. A construction machine equipped with an exhaust purification function, the construction machine comprising:
   an engine;
   an injector which injects a reducing agent for removing nitrogen oxides in exhaust gas discharged from the engine;
   an after treatment device comprising at least one of an apparatus containing a catalyst capable of reducing nitrogen monoxide, a DPF apparatus and an SCR apparatus, which is connected to the injector and which purifies the exhaust gas discharged from the engine using the injected reducing agent;
   a temperature sensor which detects a temperature of the after treatment device;
   a cooling time computing unit comprising a controller which computes a cooling time based on the temperature detected by the temperature sensor, the cooling time being a period of time during which a temperature of the exhaust gas discharged from the engine drops to or below a certain value; and
   a sound or image emitter which notifies an operator of a necessity of cooling before stopping the engine during the cooling time computed by the cooling time computing unit, further comprising:
   a state detection sensor which detects a state of the construction machine; and a prediction unit comprising the controller which predicts a stoppage of the engine when the state detected by the state detection sensor satisfies a prescribed condition, wherein the sound or image emitter notifies the operator of a necessity of cooling when a stoppage of the engine is predicted by the prediction unit.

10. The construction machine according to claim 9, further comprising an accelerator dial or pedal to which may be applied an operation to adjust a number of revolutions of the engine, wherein the state detection sensor being a first operation amount detecting sensor which detects an operation amount which is an amount of the operation applied to the accelerator dial or pedal, and the prediction unit predicts a stoppage of the engine when the operation amount detected by the first operation amount detecting sensor indicates that no operation is applied to the accelerator dial or pedal.

11. The construction machine according to claim 10, further comprising:

an actuator; and an apparatus including a lever to which may be applied an operation to move the actuator, wherein the state detection sensor is a second operation amount detecting sensor which detects an operation amount which is an amount of the operation applied to the apparatus including the lever, and the prediction unit predicts a stoppage of the engine when the operation amount detected by the second operation amount detecting sensor indicates that no operation is applied to the apparatus including the lever.

* * * * *